US012594922B2

(12) United States Patent
Roether et al.

(10) Patent No.: US 12,594,922 B2
(45) Date of Patent: Apr. 7, 2026

(54) ELECTROMAGNETIC ACTUATOR ASSEMBLY, PRESSURE CONTROL MODULE, AND VEHICLE BRAKING SYSTEM HAVING AN ELECTROMAGNETIC ACTUATOR ASSEMBLY

(71) Applicant: Knorr-Bremse Systeme Fuer Nutzfahrzeuge GmbH, Munich (DE)

(72) Inventors: Friedbert Roether, Cleebronn (DE); Ralf Woerner, Tiefenbronn (DE); Benjamin Jensen, Grossbottwar (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 8 days.

(21) Appl. No.: 18/715,859

(22) PCT Filed: Dec. 14, 2022

(86) PCT No.: PCT/EP2022/085933
§ 371 (c)(1),
(2) Date: Jun. 3, 2024

(87) PCT Pub. No.: WO2023/111066
PCT Pub. Date: Jun. 22, 2023

(65) Prior Publication Data
US 2025/0054670 A1 Feb. 13, 2025

(30) Foreign Application Priority Data
Dec. 15, 2021 (DE) ..................... 10 2021 133 221.4

(51) Int. Cl.
*F16K 31/06* (2006.01)
*B60T 15/02* (2006.01)
(Continued)

(52) U.S. Cl.
CPC ........ *B60T 15/027* (2013.01); *F16K 31/0675* (2013.01); *H01F 7/081* (2013.01); *F16K 31/0603* (2013.01); *H01F 7/1607* (2013.01)

(58) Field of Classification Search
USPC ...................... 251/129.16, 129.2; 303/119.2
See application file for complete search history.

(56) References Cited

U.S. PATENT DOCUMENTS

| | | | | |
|---|---|---|---|---|
| 10,288,187 B2 * | 5/2019 | Vogt | .................... | F16K 31/0679 |
| 2008/0149192 A1 * | 6/2008 | Holec | ..................... | F16K 47/02 137/491 |

(Continued)

FOREIGN PATENT DOCUMENTS

| | | | | |
|---|---|---|---|---|
| DE | 102014115206 B3 * | 2/2016 | .............. | B60T 17/02 |
| DE | 102014115207 A1 | 4/2016 | | |

(Continued)

OTHER PUBLICATIONS

International Search Report for PCT/EP2022/085933, Issued Apr. 3, 2023.

*Primary Examiner* — Matthew W Jellett
(74) *Attorney, Agent, or Firm* — NORTON ROSE FULBRIGHT US LLP

(57) ABSTRACT

An electromagnetic-actuator (EA) assembly includes a first EA having a first coil-arrangement (CA) with a first coil-core (CC) and a first coil and having a first movable-magnetic-armature-body (MMAB) which is movable by a magnetic-field generated by the first CA from a first into a second position in which the first AB is attracted towards a first-surface, which is different from the first CC and arranged opposite the first AB, and contacts the first CC, and a second EA having a second CA with a second CC and a second coil and having a MMAB having a damping-device mounted on the second AB and which is movable by a magnetic-field generated by the second CA from a first into (Continued)

a second position in which the second AB is attracted towards a second-surface and abuts against the second-surface by the damping-device. The first and second surfaces are identical in construction.

21 Claims, 3 Drawing Sheets

(51) Int. Cl.
  *H01F 7/08*            (2006.01)
  *H01F 7/16*            (2006.01)

(56)                    References Cited

U.S. PATENT DOCUMENTS

| | | | | |
|---|---|---|---|---|
| 2025/0027577 A1* | 1/2025 | Woerner | ............... | F16K 27/029 |
| 2025/0035231 A1* | 1/2025 | Woerner | ................. | H01F 7/081 |

FOREIGN PATENT DOCUMENTS

| | | | | |
|---|---|---|---|---|
| DE | 102016105532 A1 | 9/2017 | | |
| DE | 102018123997 A1 | 4/2020 | | |
| EP | 3209530 B1 * | 9/2018 | ......... | F16K 31/0682 |

* cited by examiner

ELECTROMAGNETIC ACTUATOR ASSEMBLY, PRESSURE CONTROL MODULE, AND VEHICLE BRAKING SYSTEM HAVING AN ELECTROMAGNETIC ACTUATOR ASSEMBLY

FIELD OF THE INVENTION

The present invention relates to an electromagnetic actuator assembly having at least a first and second electromagnetic actuator, to a pressure control module for a vehicle braking system, and to a vehicle braking system having an electromagnetic actuator assembly of this type.

BACKGROUND INFORMATION

Electromagnetic actuator assemblies which, for example, incorporate a plurality of tilting-armature valves, are exemplarily employed for pressure control, for example in a vehicle braking system and air treatment system, for example in a utility vehicle or bus for the transport of persons. A braking system for a motor vehicle having an electronic service brake system, for example, comprises a plurality of magnetic valves for pressure control, for example in the form of inlet and outlet valves for a pressure control module.

An electromagnetic actuator assembly of this type and a tilting-armature valve configured for this purpose are understood, for example, from DE 10 2014 115 206 B3, the object of which is the provision of an improved control valve for a pressure control module of a vehicle. The tilting-armature valve particularly comprises a coil element having at least one coil core and a coil which is arranged radially about the coil core, an armature ("tilting armature"), which is mounted on an end face of the armature by a bearing, wherein the armature, by the activation of the coil, is moveable from a first position to a second position, and a spring for moving the armature, which exerts a force upon the armature, in order to move the armature in the direction of the first position. A sealing element is arranged on the side of the armature which is averted from the coil element. In one half-shell, a valve seat having an outlet and an inlet for a fluid is configured, wherein the output, in the first position of the armature, is closeable by the sealing element in a fluid-tight manner.

Moreover, further configurations of magnetic valves of this type are understood, as discussed, for example, in DE 10 2014 115 207 A1, DE 10 2018 123 997 A1, or DE 10 2016 105 532 A1.

As a result of frequently differing requirements in applications of this type such as, for example, different conditions of employment and functional requirements for electromagnetic actuators or valves, it is customary for different configurations, such as inlet, outlet or back-up valves, to employ different configurations of actuators, which are appropriate to the respective requirements and conditions of employment. Thus, e.g. in DE 10 2014 115 206 B3, a perforated disk is provided which forms a limit stop for the damping element, when the armature is arranged in the second position or is moved into the latter. A perforated disk thus configured provides an advantage, in that it permits the simple implementation of an identical-part concept. A tilting-armature valve which is configured as a back-up valve is essentially distinguished by a different perforated disk and an additional connection. By the perforated disk, a tilting-armature valve can be configured as an opening valve for a back-up application, or as a switch-over valve.

However, damping elements, aside from the positive impact of reduced noise generation, can also have negative influences upon the magnetic force which acts on the armature body, on the grounds that, in many cases, the air gap between the armature body and the coil core is enlarged, and magnetic resistance is thus increased which, in turn, impairs the efficiency of the magnetic valve.

SUMMARY OF THE INVENTION

An object of the present invention is the disclosure of an electromagnetic actuator assembly of the above-mentioned type which, even in the event of different functional requirements for individual electromagnetic actuators, permits a relatively high efficiency of the actuator assembly, with nonetheless reduced manufacturing costs.

The invention relates to an electromagnetic actuator assembly of the above-mentioned type, to a pressure control module for a vehicle braking system, and to a vehicle braking system incorporating a pressure control module, having an electromagnetic actuator assembly according to the attached independent patent claims. Advantageous configurations and further developments of the invention are disclosed in the sub-claims and in the following description.

In particular, one aspect of the present invention relates to an electromagnetic actuator assembly, which comprises at least one first electromagnetic actuator having a first coil arrangement with at least one first coil core and a first coil which is arranged circumferentially about the first coil core, and having a moveable magnetic first armature body by way of a moveable actuator element, which is moveable by a magnetic field which is generated by the first coil arrangement from a first position to a second position, in which the first armature body is attracted in the direction of a first surface, which differs from the first coil core and is arranged opposite the first armature body, and contacts the first coil core. Moreover, at least one second electromagnetic actuator is provided, having a second coil arrangement with at least one second coil core and a second coil which is arranged circumferentially about the second coil core, and having a moveable magnetic second armature body by way of a moveable actuator element, which comprises a second damping device which is mounted on the second armature body and which is moveable by a magnetic field which is generated by the second coil arrangement from a first position to a second position, in which the second armature body is attracted in the direction of a second surface and engages with the second surface by the second damping device. At least the first surface and the second surface are configured in a mutually structurally identical manner.

A further aspect of the invention relates to a pressure control module for a vehicle braking system having an electromagnetic actuator assembly of this type. The invention further relates to a vehicle braking system having a pressure control module of this type.

The invention thus provides an electromagnetic actuator assembly which, even in the event of different functional requirements for individual electromagnetic actuators, permits a relatively high efficiency of the actuator assembly, with nonetheless reduced manufacturing costs. It is thus desirable, for example in the case of frequently switched actuators, such as those employed in the braking system of a passenger transport vehicle, for the frequently disturbing generation of noise associated with switching processes to be reduced by a damping element on the armature body, for example in the event that any undamped engagement of the armature is perceived as a disturbance by a bus passenger or by passers-by, on the grounds of harsh and loud structure-borne noise. Conversely, according to the invention, it has been observed that, in the case of less frequently switched actuators, in many cases, a damping element can be omitted, in order to reduce the air gap between the armature body and the coil core, and thus improve the efficiency of the actuator. According to the invention, both of these advantages can be combined in an actuator assembly, particularly in a pressure control module for a vehicle braking system, without substantially increasing the number of components in actuators which are subject to different functional requirements. For both types of actuators—with or without a damping element and having different contact surfaces—by structurally identical first and second surfaces, which are arranged opposite the respective armature bodies, for example, an identical coil configuration can be employed, as a result of which manufacturing costs can be reduced. By the invention, it is possible for differently configured armature bodies to nonetheless employ a common coil configuration, in order to restrict manufacturing costs.

According to one embodiment, the first surface is configured on a first component of the first electromagnetic actuator and the second surface is configured on a second component of the second electromagnetic actuator. The first component and the second component are configured in a mutually structurally identical manner. The number of differently configured components for the respective actuators can thus be reduced, thereby permitting a restriction of manufacturing costs.

According to one embodiment, the first component forms at least part of the first coil arrangement, and the second component forms at least part of the second coil arrangement. For example, the first component forms part of, or is the entire first coil arrangement, and the second component forms part of, or is the entire second coil arrangement. Accordingly, an at least partially identical coil arrangement configuration can be employed.

According to one embodiment, the first component comprises the first coil and the second component comprises the second coil. Accordingly, an at least partially common coil configuration can be employed.

According to one embodiment, additionally or alternatively, the first component comprises the first coil core and the second component comprises the second coil core. Here again, accordingly, an at least partially structurally identical coil arrangement can be employed.

According to one embodiment, the first armature body is mounted by a first bearing assembly, and the second armature body is mounted by a second bearing assembly, which is configured in a structurally identical manner to the first bearing assembly. Here again, accordingly, a common and structurally identical bearing concept can be employed.

According to one embodiment, the first surface of the first electromagnetic actuator comprises at least one contact profile, which is configured such that it engages with the first armature body in the second position. This provides an advantage in that, even in the event of any wear of the first coil core at the contact surface associated with the frequent and direct engagement of the first armature body, a contact profile is present in the second position, with which the first armature body will then also engage, with no further wear of the coil core.

According to one embodiment, the first and second armature bodies are configured as plate-type armatures.

According to one embodiment, the first electromagnetic actuator is configured as a zero-current open actuator, in particular as a zero-current open valve element, and the second electromagnetic actuator is configured as a zero-current closed actuator, in particular as a zero-current closed valve element. This provides an advantageous field of application for an actuator assembly according to the invention.

According to one embodiment, the first and second electromagnetic actuators are configured as an electromagnetic valve device having the first or second armature body as a respective valve element. In particular, they are configured as a respective magnetic valve.

According to one embodiment, the first and second electromagnetic actuators are respectively configured as a tilting-armature valve.

In an advantageous embodiment, the first and second electromagnetic actuators are respectively configured as a magnetic valve for a pressure control module of a vehicle.

The actuator assembly according to the invention is particularly advantageous if, in addition to the first and second actuators, at least one third electromagnetic actuator is further provided, having a third coil arrangement with at least one third coil core and a third coil which is arranged circumferentially about the third coil core, and having a moveable magnetic third armature body by way of a moveable actuator element, which comprises a third damping device which is mounted on the third armature body and which is moveable by a magnetic field which is generated by the third coil arrangement from a first position to a second position, in which the third armature body is attracted in the direction of a third surface and engages with at least the third surface by the third damping device. This third surface is also configured in a structurally identical manner to the first and second surface. Thus, for the at least three actuators, an at least partially common coil configuration can be employed.

According to one embodiment, an electromagnetic actuator assembly of this type is configured for a pressure control module of a vehicle braking system, wherein the second electromagnetic actuator is configured as an inlet valve, the third electromagnetic actuator as an outlet valve, and the first electromagnetic actuator as a back-up valve. According to one embodiment, the electromagnetic actuator assembly further comprises a control device, which is connectable to the first to third electromagnetic actuators for the respective actuation, energization and de-energization thereof, wherein the control device is configured such that the first electromagnetic actuator is energized at the start of a braking operation of the vehicle and is de-energized at the end of the braking operation of the vehicle, and the second and third electromagnetic actuators are respectively and repeatedly energized and de-energized between the start and end of braking, for the purposes of pressure modification during the braking of the vehicle. By actuators which are appropriately configured for their respective application, even in the event of differing functional requirements for the individual electromagnetic actuators, a relatively high efficiency of the actuator assembly can be achieved and the number of components nonetheless restricted, for example by an at least partially common coil configuration.

The embodiments described herein can be employed side-by-side, or mutually employed in an arbitrary combination.

The invention is described in greater detail hereinafter with reference to the figures represented in the drawing.

DETAILED DESCRIPTION

In the present disclosure, the designation of individual elements as a "first", "second" or "third" element is intended to contribute to the unambiguous identification of the respective elements, even in the absence of any specific reference numbers, which is characteristic of an association with a specific actuator, and is to be understood as a distinguishable identification only, and not in the sense of any numbering, listing or number of elements. For example, this means that an element can be designated, for example, as a "second" element, without the necessity for the existence of a functionally or structurally equivalent "first" element.

In the following description, elements having an identical or similar function are identified by identical or similar reference symbols.

Figure 1:
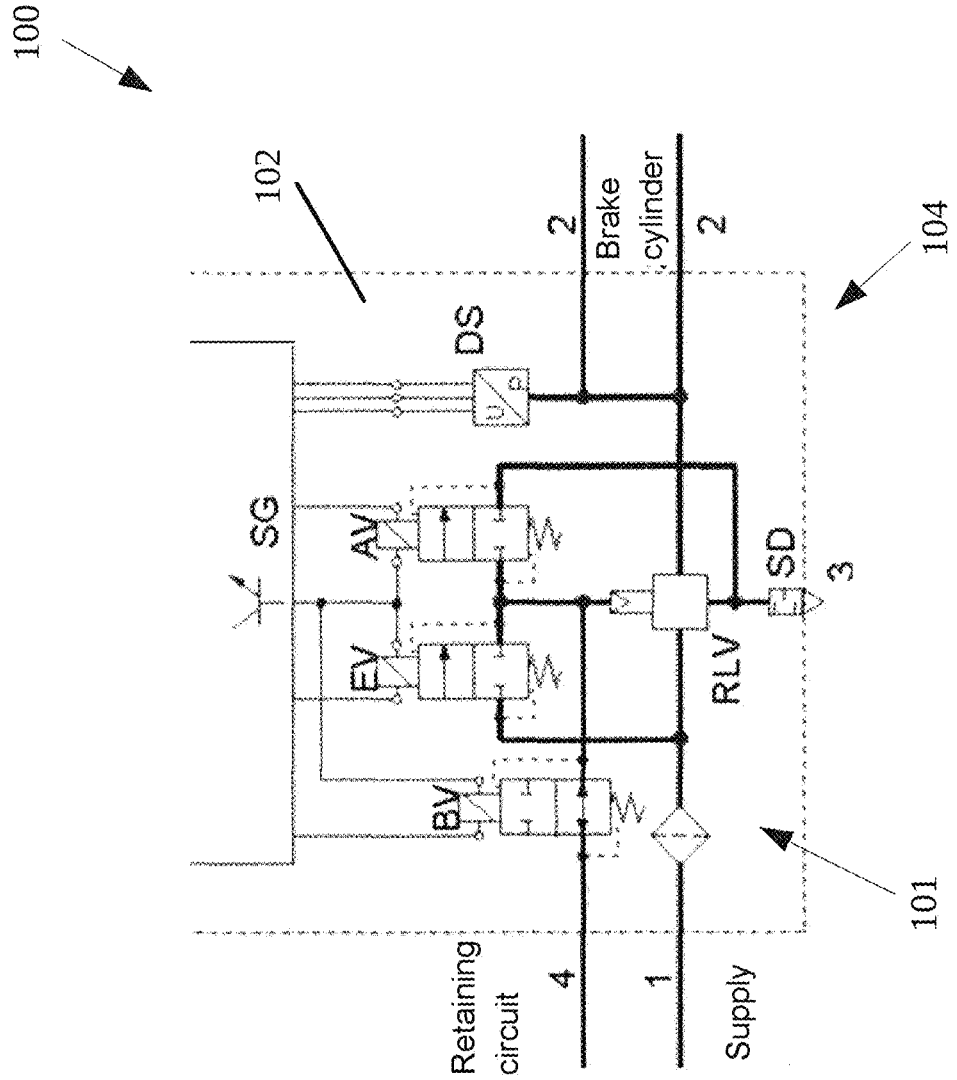
FIG. 1 shows a schematic representation of a vehicle braking system having a pressure control module and an actuator assembly according to one exemplary embodiment of the present invention.

FIG. 1 shows a schematic representation of a vehicle braking system 104 of a vehicle 100 having a pressure control module 102 according to one exemplary embodiment of the present invention. In the pressure control module 102, one embodiment of an actuator assembly 101 according to the invention, in particular having a plurality of magnetic valves, is provided. The pressure control module 102, in the form represented, is an advantageous embodiment. In principle, however, an actuator assembly 101 according to the invention is also advantageously employable in other configurations.

In the exemplary embodiment represented in FIG. 1, the vehicle 100, for example, is a utility vehicle, e.g. a heavy goods vehicle or a passenger bus. The pressure control module 102 is part of an electronic vehicle braking system 104 having at least one brake cylinder 2 and a pressure control module 102 which is assigned to the brake cylinder 2. The pressure control module 102 respectively comprises an electromagnetic actuator by way of a magnetic inlet valve EV, a magnetic outlet valve AV, and a back-up valve BV. In combination, the magnetic inlet valve EV, the magnetic outlet valve AV and the back-up valve BV, as embodiments of respective electromagnetic actuators, thus form one embodiment of an actuator assembly 101 according to the invention.

The magnetic inlet valve EV is connected to a supply air reservoir 1. By the actuation of the magnetic inlet valve EV or the magnetic outlet valve AV, during the braking of the vehicle 100, a predefined pressure setting is established by the electronic brake control circuit (schematically represented in the form of the control device SG). Moreover, the magnetic back-up valve BV is connected via a back-up line to a conventional back-up system 4 (also described as a retaining circuit) in which, e.g. by a pneumatic footbrake valve, a pressure is applied upon braking. This permits a braking of the vehicle 100, notwithstanding any loss of the electrical brake control circuit. To this end, the magnetic inlet valve EV and the magnetic outlet valve AV are closed in a de-energized state (i.e. are respectively zero-current closed valve elements, frequently described as "normally closed" or "NC"), and the magnetic back-up valve BV is open in a de-energized state (i.e. is a zero-current open valve element, frequently described as "normally open" or "NO").

The electronic control device SG (for example in the form of, or having one or more microprocessors) is provided e.g. in the ECU (Electronic Control Unit) of the vehicle 100 and, for a respective actuation and activation of energization and de-energization, is connectable to the magnetic valves EV, AV, BV in a hard-wired or wireless arrangement. The control device SG is configured such that magnetic valve BV is energized at the start of a braking of the vehicle 100 and is de-energized at the end of the braking of the vehicle 100. Conversely, each of the magnetic valves EV, AV, for a pressure adjustment which is controlled by the control device SG, is energized and de-energized a number of times during the braking of the vehicle 100, between the start and end of braking.

The magnetic inlet valve EV is thus provided for the admission of air, and the magnetic outlet valve AV for the release of air. By the electronic control device SG, according to one embodiment, pressure is measured by a pressure sensor and, in accordance with a target setpoint, pressure is built up via the magnetic inlet valve EV and relieved via the magnetic outlet valve AV. Pressure adjustment involves the frequent switching of both magnetic valves EV, AV, which are thus frequently energized and de-energized. As a result of switching, structure-borne noise is generated upon the engagement of the armature body with the respective coil core. In order to reduce this noise, it is advantageous if both magnetic valves are damped by a damping device (for example in the form of a rubber contact surface).

Conversely, the magnetic back-up valve BV is energized at the start of braking and de-energized at the end of braking. As this magnetic valve is thus switched only once during a braking operation, it has been observed according to the invention that, in general, structure-borne noise is not inordinately disturbing and a rubber damping element is not required, such that, by a reduction of the air gap between the armature body and the coil core, an increase in the magnetic force is permitted with equal excitation.

Figure 2:
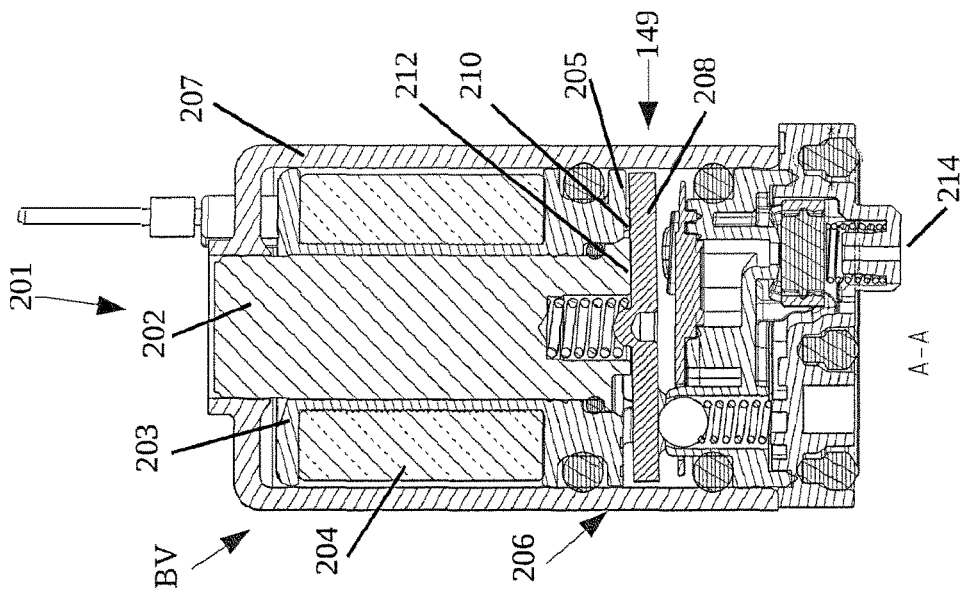
FIG. 2 shows schematic cross-sectional representations of a number of electromagnetic actuators in the respective form of exemplary tilting-armature valves, which are employable in an actuator assembly according to one exemplary embodiment of the present invention.
Figure 3:
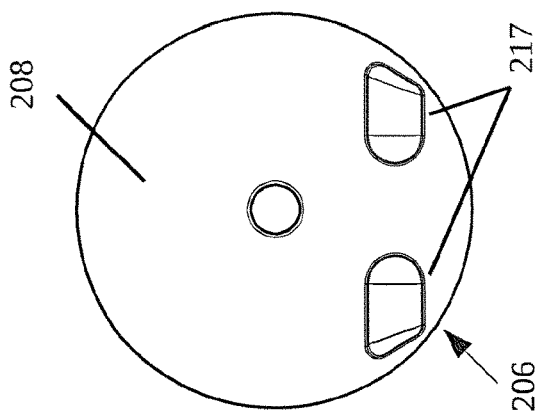
FIG. 3 shows schematic representations of the respective armature bodies of the electromagnetic actuators according to FIG. 2, according to respective embodiments of the present invention.
Figure 3:
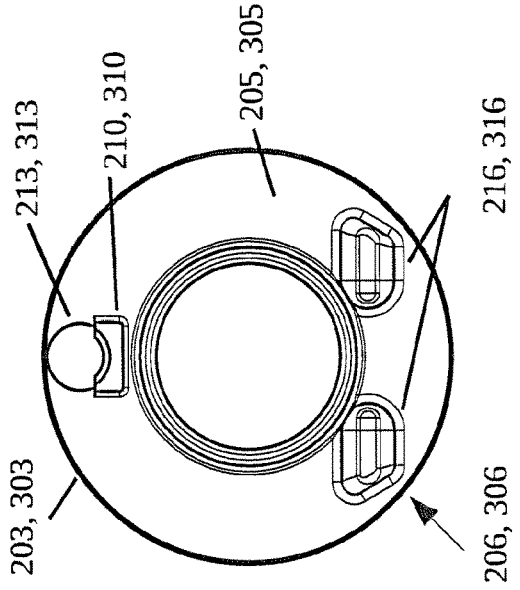
Figure 3:
Figure 3:
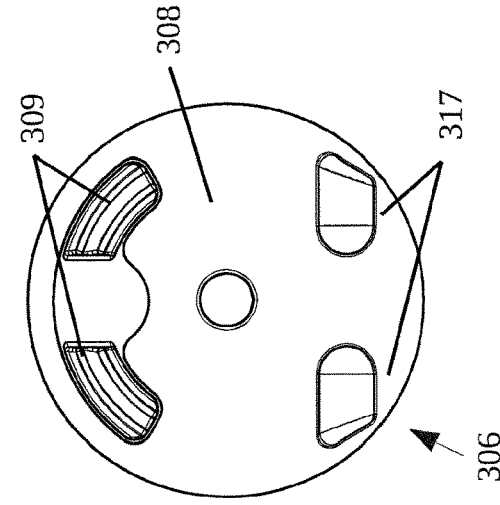

Advantageous exemplary embodiments of actuators which are employable as a magnetic inlet valve EV or magnetic outlet valve AV, and as a magnetic back-up valve BV, are represented in FIGS. 2 and 3. FIG. 2 shows schematic cross-sectional representations of magnetic valves EV, AV, BV, which are configured as NC magnetic valves or NO magnetic valves, in the respective form of exemplary tilting-armature valves which are employable in an actuator assembly according to one exemplary embodiment of the present invention. The magnetic valves EV, AV are configured in a structurally identical manner and, in cross-section, are represented by two common sectional images along the section line A-A or C-C. In cross-section, the magnetic valve BV is represented along section line A-A only (c.f. the overhead view of the magnetic valves EV, AV, BV in the lower part of FIG. 2, which is identical for all three magnetic valves).

FIG. 3 shows schematic representations of the respective armature bodies 208, 308 of the magnetic valves EV, AV, BV according to FIG. 2, in an overhead view, according to respective embodiments of the present invention. A surface 205, 305 of the coil body 203 or 303 of the magnetic valves EV, AV, BV according to FIG. 2 is also represented in an overhead view (or from below, in the case of an unfitted armature body 208, 308).

The mode of operation of a magnetic valve, here in the form of a tilting-armature valve, will firstly be described in greater detail with reference to the magnetic valves EV, AV. In this connection, it should be observed that the fundamental mode of operation of electromagnetic actuators, and of valve devices of this type having an armature body which is moveable by a magnetic field by way of a valve element, will be known to a person skilled in the art. In principle, the electromagnetic actuator assembly according to the invention can not only be employed for magnetic valves, but also for electrical switching devices such as electrical relays. The electromagnetic actuator assembly according to the invention may be employed for magnetic valves, which may be for tilting-armature valves, in a braking system of a vehicle, particularly of a utility vehicle.

In the present exemplary embodiment, the magnetic valves EV, AV are configured in a structurally identical manner and, in essence, respectively comprise a housing 307 which, in the present case, is cylindrical (for example of a magnetic material) and a coil arrangement 301 having at least one coil core 302 and a coil which is arranged circumferentially about the coil core 302. The coil, in turn, comprises a coil body 303 (for example of a plastic) and a coil winding 304 by which a magnetic field is generated, by the coil core 302.

FIG. 2 shows a cross-sectional representation of a magnetic valve EV, AV, in which the armature body (or armature for short) 308 is arranged in the second attracted position 149, in which the armature 308 is attracted by a magnetic field which is generated by the coil arrangement 301. An opposing end face of the armature 308 is mounted by a bearing assembly 306. The latter can be variously configured, as variously described in the above-mentioned documents. In the present exemplary embodiment, for example, the bearing device 306 is comprised of an approximately semi-cylindrical bearing dome 316 on the coil body 303 and corresponding recesses 317 in the armature body 308.

However, other forms of mounting—with or without additional spring elements—are also possible. In the present exemplary embodiment, for example, the armature body 308 is compressed against the bearing, for example by a spiral spring, in the direction of the coil body 303.

The armature 308 is thus moveable between an unrepresented first position (in which the armature 308 has dropped away from the coil body 303) and the second attracted position 149, which is represented. In the event of an energized coil winding 304, the armature 308 can be moved to the second position 149 and retained therein. On the side of the armature 308 which is averted from the coil body 303, a sealing element 311 is arranged, by which, in the known manner of an on-off valve, a fluid stream can be permitted or interrupted. An outlet of the magnetic valve is thus closable in a fluid-tight manner by the sealing element 311, if the armature 308 is arranged in the dropped position (normally closed; NC). However, the respective valve function by a sealing element 311 can also be configured in another manner.

On the armature 308, next to the sealing element 311, at least one damping device in the form of one, or in this case, a plurality of damping members 309. The sealing element 311 is arranged on the side of the armature 308 which is averted from the coil body 303. Moreover, the one or more damping members 309 is/are arranged on the side of the armature 308 which faces the coil body 303. In the exemplary embodiment represented, the sealing element 311 is formed integrally with the one or more damping members 309. However, the latter can also be formed separately and fastened to the armature 308. In one exemplary embodiment, both the sealing element 311 and the one or more damping members 309 are formed of an elastomer such as, for example, rubber. The coil core 302, the housing 307 and the armature 308 comprise a magnetically conductive material. If the armature 308 is positioned in the second position 149, the fluid outlet 312 is released, and the magnetic valve EV, AV is switched to a throughput or throughflow setting.

If the armature 308 (and thus the opposing side of the coil body 303 to the armature 308) is attracted in the direction of the surface 305, it is moved into the second position 149, in which the armature 308 engages with the surface 305 via the damping device 309. This means that, in the second position 149, the damping device 309 is arranged between the armature 308 and the surface 305. The damping material of the one or more damping members 309 may be provided such that the latter, in the event of a contact movement of the armature 308 in the direction of the coil body 303, upon engagement with the surface 305 thereof, undergoes elastic deformation associated with the mutual compression of convex surfaces, in order to cushion the impact. The damping device in the form of one or more damping members 309 thus functions as an elastically deformable limit stop for the armature 308, in the present case in the form of a plate-type armature. As a result, oscillations in the plate-type armature, together with any generation of noise disturbance, particularly structure-borne noise which, for example, can potentially be triggered by impacts or vibrations, or by the rapid movement of the plate-type armature into the opening position, can be suppressed or prevented. Other geometrical shapes and/or materials other than rubber can be employed in a damping device or in the damping members.

With reference to FIG. 1, both the magnetic inlet valve EV and the magnetic outlet valve AV, which are frequently switched during a braking operation, are structured in this manner. Conversely, the magnetic valve BV is structured according to a similar magnetic armature principle but, by way of distinction, is configured as a normally open magnetic valve, and comprises no damping device.

FIG. 2 likewise shows a cross-sectional representation of the magnetic valve BV, in which the armature 208 is also located in the second attracted position 149, into which the armature 208 is attracted by a magnetic field which is generated by the coil arrangement 201. An opposing end face of the armature 208 is mounted by a bearing assembly 206. Although this can be configured differently from the bearing assembly 306, it is advantageous if the bearing assembly 206 is configured in a structurally identical manner to that of the magnetic valves EV, AV, in order to permit the employment of an identical coil configuration and reduce the number of different components or parts. Accordingly, the bearing assembly 206 comprises bearing domes 216 on the coil body 203 which correspond to the bearing domes 316, and recesses 217 on the armature 208 which correspond to the recesses 317.

The armature 208 is also moveable between an unrepresented first position (in which the armature 208 has dropped away from the coil body 203) and the second attracted position 149, which is represented. In the event of an energized coil winding 204, the armature 208 can be moved to the second position 149 and retained therein. An output of the magnetic valve is thus open, if the armature 208 is arranged in the dropped position (normally open; NO). By way of distinction from the magnetic valves EV, AV, the armature 208 is attracted in the direction of the surface 205 of the coil body 203 which is arranged in opposition to the armature 208, but does not necessarily engage with this surface 205. Although the armature 208 is attracted in the direction of the surface 205, it contacts the coil core 202 directly, and thus a contact surface 212 of the coil core 202, which differs from the surface 205 of the coil body 203. This provides an advantage in that, for the magnetic flux between the coil core 202 and the armature 208, essentially no air gap is present, as a result of which the magnetic resistance between the coil core 202 and the armature 208 is reduced, and the efficiency of the magnetic valve can be enhanced. The armature body 208 of the electromagnetic actuator BV thus engages with the surface of the coil core 202.

Advantageously, however, according to one embodiment, the surface 205 of the magnetic valve BV nevertheless comprises at least one further contact profile 210, which is configured such that the armature 208 contacts the latter, at least in the course of its service life, upon the engagement thereof in the second position 149. The contact profile 210 is configured, for example, on the coil body 203. It is configured e.g. in the form of a projection, which may be of a plastic material. This projection is positioned such that, in the event of any gradual wear of the contact surface 212 of the coil core 202 (which, e.g. as per the armature 208, is formed of steel) associated with the frequent and direct engagement of the armature 208, it assumes an increasing load-bearing function. In other words, the projection 210, in relation to the contact surface 212, if the armature 208 is located in the second position 149, is offset to the rear, such that the armature 208 only engages with the contact surface 212 of coil core 202, thus resulting, so to speak, in steel-on-steel contact. If the contact surface 212 is increasingly abraded, as a result of frequent engagement and associated wear, or otherwise undergoes plastic strain, the contact surface 212 and the projection 210, in the plane of the armature surface in the second position 149, are arranged in-line, such that the armature 208, in the course of its service life, engages with the projection 210. Advantageously, any further wear of the coil core contact surface 212 can thus be prevented, although the coil core 202 continues to be contacted directly by the armature 208. The armature 208 thus engages initially with the coil core 202 and, further to the deformation of the coil core 202 and/or of the armature 208, the contact profile 210 assumes the contact function with the coil body 203, for the engagement of the armature 208.

FIG. 3 shows a more detailed representation to the effect that the surface 205, in this case of the coil body 203, and the surface 305, in this case of the coil body 303, both of which are arranged opposite the respective armature 208, 308, are configured in a mutually structurally identical manner. This can also be seen in the sectional images at A-A, according to FIG. 2. Accordingly, the surface 305 of the magnetic valves EV, AV also comprises e.g. a projection 310 (shaped identically to the contact profile or the projection 210), although the latter, in this case, assumes no such function. In this context, in particular, the term "structurally identical" signifies that the surfaces assume an identical three-dimensional surface structure and an identical three-dimensional surface shape.

In particular, the term "structurally identical" is intended to signify that the respective structurally identical surfaces are constructed in an identical manner, such that they assume identically configured three-dimensional surface structures and surface shapes, wherein any manufacturing tolerances are of no significance in this context. In other words, this means that structurally identical surfaces assume an identical configuration, with respect to structure and shape, but are not required to be absolutely identical in their three-dimensional shapes and/or structures, given that, in practical production, manufacturing tolerances or other minor deviations, for example between different production batches, can occur in parts or components of identical configuration.

The surfaces 205 and 305 may be configured on the respective coil body. In particular, they form a surface which is arranged opposite the respective armature, wherein only an air gap is present between the armature and the surface (in the case of the armature 308, at least in a region in which no damping element 309 is present). In FIG. 3, in the interests of completeness, a respective injection point 213, 313 is also represented, which can be employed during the manufacture of the respective coil body.

According to one embodiment, the surface 205 is configured on a first component, for example on the coil body 203 of the magnetic valve BV, and the surface 305 is configured on a second component, for example on the corresponding coil body 303 of the magnetic valve EV, AV. Advantageously, the first component and the second component are configured in a mutually structurally identical manner. The number of differently configured components for the respective magnetic valves can thus be reduced, thereby permitting a restriction of manufacturing costs.

According to one embodiment, mutually structurally identical components form the, or a respective part of the respective coil arrangement. In other words, the first component is at least a part of the coil arrangement 201, and the second component is at least a part of the coil arrangement 301. For example, the first component is a part (for example the coil 203, 204 and/or the coil core 202) of the coil arrangement 201, or the entire coil arrangement 201 and, correspondingly, the second component is a part of, or the entire coil arrangement 301. For example, structurally identical coil arrangements 201 and 301 are employed, which comprise structurally identical coil cores 202, 302, coil bodies 203, 303 and coil windings 204, 304. Structurally identical coil arrangements can also comprise fewer or more structurally identical parts or components. For example, structurally identical coil arrangements are fitted in the form of respective pre-assembled units to the respective magnetic valve. Accordingly, an at least partially structurally identical configuration can be employed for the respective coil arrangements 201, 301. By the employment of an identical coil configuration for the three magnetic valves, the quantity of units can be increased and the number of components reduced. This increased volume of coil arrangements is associated with reduced production costs.

In particular, in the context of the present invention, the term "structurally identical" signifies that the respective structurally identical parts or components are constructed in an identical manner (such that they assume identically configured three-dimensional shapes and structures and surface shapes), wherein any manufacturing tolerances are of no significance in this context. In other words, this means that structurally identical parts or components assume an identical configuration, with respect to structure and shape, but are not required to be absolutely identical in their three-dimensional shapes and/or structures, given that, in practical production, manufacturing tolerances or other minor deviations, for example between different production batches, can occur in parts or components of identical configuration. For example, structurally identical parts or components can be provided in the form of pre-assembled units or components (or parts) of respectively identical configuration.

The invention provides an advantage in that, for the NC magnetic valves EV, AV and the NO magnetic valve BV, a common configuration of coil arrangement (or coil configuration for short) can be employed. Armature contact surfaces are differently configured in the respective coil arrangement: in the magnetic valve EV, AV, contact is executed at the surface 305, i.e. the armature engages with the plastic surface of the coil body via a rubber damper or, in the case of the magnetic valve BV, with the coil core 202 (at the contact surface 212), i.e. the armature engages directly with the coil core.

By the differing configuration of the armature, it is possible for different contact surfaces to be employed in a single coil configuration. In the case of the magnetic valve BV, it is advantageous that the armature engages directly with the coil core. In the event of an energized armature, direct contact with the armature is associated with no air gap, or a very small air gap. This small air gap is advantageous, as the magnetic valve is energized over the entire braking time, and it is intended that the holding current should be reduced after engagement, in order to restrict heat-up. As a result of the small hair gap, the holding current can be substantially reduced, and heat-up is thus restricted to a minimum. Optionally, for other applications, the magnetic valve BV can also be configured as a 3/2 magnetic valve in which, in particular, two valve seats are provided. For example, a further connection can be attached at the bore 214, thus permitting a 3/2 magnetic valve function.

In the case of the magnetic valves EV, AV, the engagement thereof is advantageously arrested by a damping device, in order to reduce structure-borne noise. This noise is perceived as negative in the passenger compartment of a vehicle. In order to achieve effective damping, energy is transferred from the armature via the damping device to the coil arrangement. The damping member configuration should be selected such that negative acceleration does not cause the armature to engage with the coil core. Structure-borne noise would otherwise be substantially increased.

By the employment of an identical coil configuration for the three magnetic valves, the quantity of units can be increased and the number of components reduced. This increased volume of coil arrangements is associated with reduced production costs. At the same time, by the invention, even in the event of different functional requirements for individual magnetic valves and different configurations of magnetic valve such as, for example, NC or NO magnetic valves, a relatively high overall efficiency of the magnetic valve assembly can nevertheless be achieved, as damping elements can be omitted, where these are not necessary, thus permitting the enhancement of efficiency.

THE LIST OF REFERENCE SYMBOLS IS AS FOLLOWS

EV Magnetic inlet valve
AV Magnetic outlet valve
BV Back-up valve
SG Control device
1 Supply reservoir
2 Brake cylinder
4 Back-up system/retaining circuit
100 Vehicle
101 Actuator assembly
102 Pressure control module
104 Vehicle braking system
149 Second position
201, 301 Coil arrangement
202, 302 Coil core
203, 303 Coil body
204, 304 Coil winding
205, 305 Surface 206, 306 Bearing assembly
207, 307 Housing
208, 308 Armature body
210, 310 Contact profile/projection
212 Contact surface
213, 313 Injection point
214 Bore
216, 316 Bearing domes
217, 317 Recesses
309 Damping device
311 Sealing element
312 Fluid outlet

The invention claimed is:

1. An electromagnetic actuator assembly, comprising:
at least one first electromagnetic actuator having a first coil arrangement with at least one first coil core and a first coil which is arranged circumferentially about the first coil core, and having a moveable first armature body as a moveable actuator element, which is moveable by a magnetic field, which is generated by the first coil arrangement, from a first position to a second position, in which the moveable first armature body is magnetically attracted in a direction of a first surface and contacts a surface of the first coil core directly, the first surface being different from the surface of the first coil core and being on a separate part relative to the first coil core, and wherein the first surface is arranged opposite the moveable first armature body, and contacts the first coil core; and
at least one second electromagnetic actuator, having a second coil arrangement with at least one second coil core and a second coil which is arranged circumferentially about the second coil core, and having a moveable second armature body as a moveable actuator element, which includes a second damping device which is mounted on the moveable second armature body and which is moveable by a magnetic field which is generated by the second coil arrangement from a first position to a second position, in which the moveable second armature body is magnetically attracted in a direction of a second surface and engages with the second surface via the second damping device;
wherein the first surface and the second surface are configured with a mutually structurally identical configuration.

2. The electromagnetic actuator assembly of claim 1, wherein the first surface is configured on a first component of the first electromagnetic actuator and the second surface is configured on a second component of the second electromagnetic actuator, and wherein the first component and the second component are configured with a mutually structurally identical configuration.

3. The electromagnetic actuator assembly of claim 2, wherein the first component forms at least part of the first coil arrangement, and the second component forms at least part of the second coil arrangement.

4. The electromagnetic actuator assembly of claim 2, wherein the first component includes the first coil and the second component includes the second coil.

5. The electromagnetic actuator assembly of claim 2, wherein the first component includes the first coil core and the second component includes the second coil core.

6. The electromagnetic actuator assembly of claim 1, wherein the moveable first armature body is mounted by a first bearing assembly and the moveable second armature body is mounted by a second bearing assembly, which is configured in a structurally identical manner to the first bearing assembly.

7. The electromagnetic actuator assembly of claim 1, wherein the moveable first and the second armature bodies include plate-type armatures.

8. The electromagnetic actuator assembly of claim 1, wherein the first electromagnetic actuator includes a zero-current open actuator, which is a zero-current open valve element, and the second electromagnetic actuator is configured as a zero-current closed actuator, which is a zero-current closed valve element.

9. The electromagnetic actuator assembly of claim 1, wherein the first and second electromagnetic actuators are configured as an electromagnetic valve device having the first or second armature body as a respective valve element and which includes a respective magnetic valve.

10. The electromagnetic actuator assembly of claim 1, wherein the first and second electromagnetic actuators are respectively configured as a tilting armature valve.

11. The electromagnetic actuator assembly of claim 1, wherein the first and second electromagnetic actuators are respectively configured as a magnetic valve for a pressure control module of a vehicle.

12. The electromagnetic actuator assembly of claim 1, further comprising:

at least one third electromagnetic actuator having a third coil arrangement with at least one third coil core and a third coil which is arranged circumferentially about the third coil core;

a moveable third armature body as a moveable actuator element, which includes a third damping device which is mounted on the moveable third armature body and which is moveable by a magnetic field, which is generated by the third coil arrangement, from a first position to a second position, in which the moveable third armature body is attracted in the direction of a third surface and engages with at least the third surface by the third damping device, at a coil body of the third coil arrangement;

wherein the third surface is configured in a structurally identical manner to the first and second surface.

13. The electromagnetic actuator assembly of claim 12, wherein the electromagnetic actuator assembly is configured for a pressure control module of a vehicle braking system, and wherein the second electromagnetic actuator is configured as an inlet valve, the third electromagnetic actuator as an outlet valve, and the first electromagnetic actuator as a back-up valve.

14. The electromagnetic actuator assembly of claim 13, further comprising:

a control device, which is connectable to the first to third electromagnetic actuators for the respective actuation, energization and de-energization thereof;

wherein the control device is configured such that the first electromagnetic actuator is energized at the start of a braking operation of the vehicle and is de-energized at the end of the braking operation of the vehicle, and the second and third electromagnetic actuators are respectively and repeatedly energized and de-energized between the start and end of braking, for the purposes of pressure modification during the braking of the vehicle.

15. A pressure control module for a vehicle braking system, comprising:

an electromagnetic actuator assembly, including:

at least one first electromagnetic actuator having a first coil arrangement with at least one first coil core and a first coil which is arranged circumferentially about the first coil core, and having a moveable first armature body as a moveable actuator element, which is moveable by a magnetic field which is generated by the first coil arrangement from a first position to a second position, in which the moveable first armature body is magnetically attracted in a direction of a first surface and contacts a surface of the first coil core directly, the first surface being different from the surface of the first coil core and being on a separate part relative to the first coil core; and wherein the first surface is arranged opposite the moveable first armature body, and contacts the first coil core; and at least one second electromagnetic actuator, having a second coil arrangement with at least one second coil core and a second coil which is arranged circumferentially about the second coil core, and having a moveable second armature body as a moveable actuator element, which includes a second damping device which is mounted on the second armature body and which is moveable by a magnetic field which is generated by the second coil arrangement from a first position to a second position, in which the second armature body is magnetically attracted in a direction of a second surface and engages with the second surface via the second damping device;

wherein the first surface and the second surface are configured with a mutually structurally identical configuration.

16. A vehicle braking system, comprising:

a pressure control module having an electromagnetic actuator assembly, wherein the electromagnetic actuator assembly includes:

at least one first electromagnetic actuator having a first coil arrangement with at least one first coil core and a first coil which is arranged circumferentially about the first coil core, and having a moveable first armature body as a moveable actuator element, which is moveable by a magnetic field which is generated by the first coil arrangement from a first position to a second position, in which the moveable first armature body is magnetically attracted in a direction of a first surface and contacts a surface of the first coil core directly, the first surface being different from the surface of the first coil code and being on a separate part relative to the first coil core, and wherein the first surface is arranged opposite the moveable first armature body, and contacts the first coil core; and at least one second electromagnetic actuator, having a second coil arrangement with at least one second coil core and a second coil which is arranged circumferentially about the second coil core, and having a moveable magnetic second armature body as a moveable actuator element, which includes a second damping device which is mounted on the second armature body and which is moveable by a magnetic field which is generated by the second coil arrangement from a first position to a second position, in which the second armature body is magnetically attracted in a direction of a second surface and engages with the second surface via the second damping device;

wherein the first surface and the second surface are configured with a mutually structurally identical configuration.

17. The pressure control module of claim 15, wherein in the second position, the moveable first armature body engages initially with the first coil core and, and after a deformation of the first coil core and/or of the moveable first armature body, a further contact profile on a coil body of the first coil arrangement assumes a contact function for contacting the moveable first armature body.

18. The vehicle braking system of claim 16, wherein in the second position, the moveable first armature body engages initially with the first coil core and, and after a deformation of the first coil core and/or of the moveable first armature body, a further contact profile on a coil body of the first coil arrangement assumes a contact function for contacting the moveable first armature body.

19. The pressure control module of claim 15, wherein the first and second electromagnetic actuators are respectively configured as a tilting armature valve.

20. The vehicle braking system of claim 16, wherein the first and second electromagnetic actuators are respectively configured as a tilting armature valve.

21. An electromagnetic actuator assembly, comprising:

at least one first electromagnetic actuator having a first coil arrangement with at least one first coil core and a first coil which is arranged circumferentially about the first coil core, and having a moveable first armature body as a moveable actuator element, which is moveable by a magnetic field, which is generated by the first coil arrangement, from a first position to a second position, in which the moveable first armature body is magnetically attracted in a direction of a first surface, which differs from the first coil core, and is arranged opposite the moveable first armature body, and contacts the first coil core, and wherein in the second position, the magnetic armature of the first electromagnetic actuator engages with a surface of the first coil core; and at least one second electromagnetic actuator, having a second coil arrangement with at least one second coil core and a second coil which is arranged circumferentially about the second coil core, and having a moveable second armature body as a moveable actuator element, which includes a second damping device which is mounted on the moveable second armature body and which is moveable by a magnetic field which is generated by the second coil arrangement from a first position to a second position, in which the moveable second armature body is magnetically attracted in a direction of a second surface and engages with the second surface via the second damping device;

wherein the first surface and the second surface are configured with a mutually structurally identical configuration;

wherein the moveable first armature body engages initially with the first coil core and, and after a deformation of the first coil core and/or of the moveable first armature body, a further contact profile on a coil body of the first coil arrangement assumes a contact function for contacting the moveable first armature body.

* * * * *